April 29, 1969  W. G. FLANNELLY  3,441,238
DYNAMIC ANTIRESONANT VIBRATION ISOLATOR
Filed May 26, 1967  Sheet 1 of 3

INVENTOR.
WILLIAM G. FLANNELLY
BY McCormick, Paulding & Huber
ATTORNEYS

United States Patent Office 3,441,238
Patented Apr. 29, 1969

1

3,441,238
DYNAMIC ANTIRESONANT VIBRATION ISOLATOR
William G. Flannelly, South Windsor, Conn., assignor to Kaman Corporation, Bloomfield, Conn., a corporation of Connecticut
Filed May 26, 1967, Ser. No. 641,541
Int. Cl. F16f *15/04*
U.S. Cl. 248—20                                    6 Claims

ABSTRACT OF THE DISCLOSURE

A vibration isolator is disclosed for reducing the transmission of vibratory and shock forces from an excited base to an isolated item. The isolator is a passive system wherein spring forces are counteracted by inertia forces to produce a high degree of isolation at certain frequencies of vibration with low static deflection. An intermediate member is located between the base and the isolated item and connected to the base by a spring and damper. Between the intermediate member and the isolated item is another spring and damper and an inertia system including an auxiliary mass which is moved relative to both the intermediate member and the isolated item in response to relative movement of the latter two parts.

Background of the invention

This invention relates to vibration isolators, and deals more particularly with a passive vibration isolator consisting primarily of a system of springs, masses and dampers arranged to produce a substantially zero or very low transmissibility of vibratory forces or displacements thereacross at a tuned, or antiresonant, frequency, usually a relative low frequency, and to also produce a desirably reduced transmissibility over a relatively wide range of frequencies.

Part of the vibration isolator of this invention is somewhat similar to that shown and described in my copending application Ser. No. 408,543 filed Nov. 3, 1964, now Patent No. 3,322,379, and entitled Dynamic Antiresonant Vibration Isolator, the isolator of this invention being one which in general has improved high frequency vibration isolation characteristics in comparison to the latter device.

Summary of the invention

This invention resides in a passive vibration isolator connected between a vibrating base and an isolated body for reducing the transmission of vibratory forces and displacements from the base to the body. The isolator includes an intermediate member between the body and the base. Between the body and the intermediate member, it includes an auxiliary mass and spring system dynamically excited by the vibratory movement of the intermediate member relative to the isolated body. Between the intermediate member and the vibrating base is a spring and damper system. A damper may also be included between the isolated body and the intermediate member.

2

Figure 4:
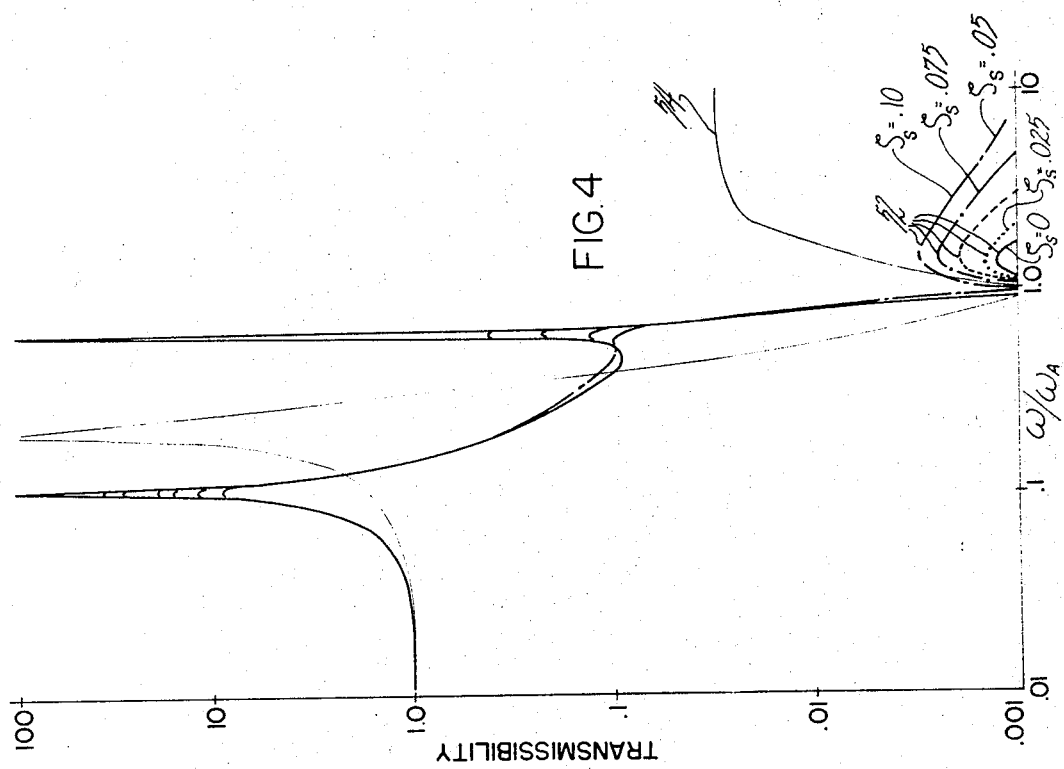

FIG. 4 is a series of curves showing the effect of various values of damping on the operation of a vibration isolator such as shown either in FIG. 1 or FIG. 2 and where the parameters of the isolator are so selected that the two resonant frequencies are both located below the antiresonant frequency.

Figure 1:
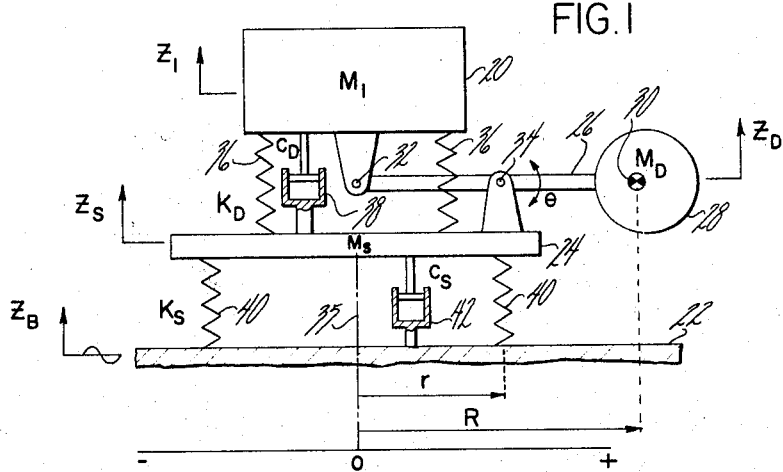
FIG. 1 is a schematic illustration of a vibration isolator comprising one embodiment of this invention.
Figure 5:
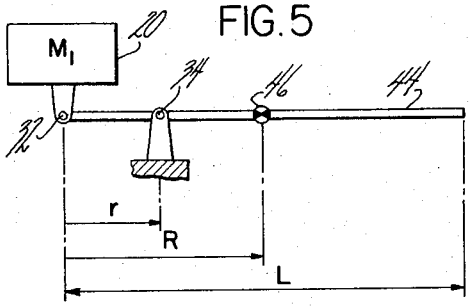

FIG. 5 is a fragmentary schematic illustration of a vibration isolator generally similar to that shown in FIG. 1 but with the inertia means consisting merely of a thin inertia bar.

Figure 2:
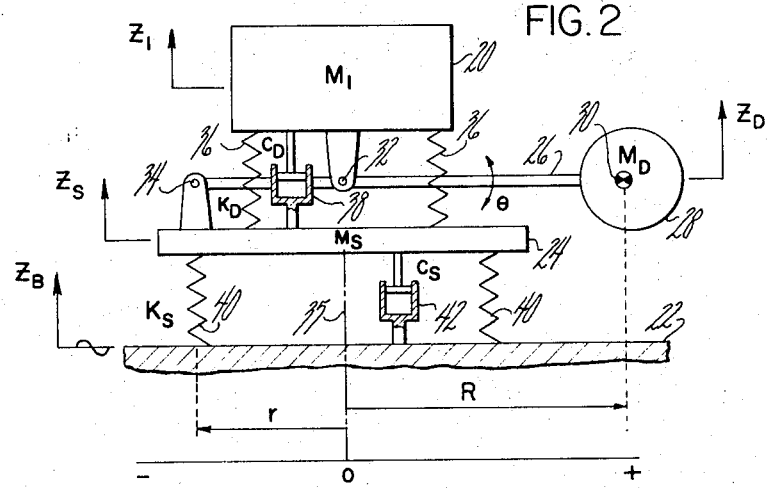
FIG. 2 is a schematic illustration of another vibration isolator comprising another embodiment of this invention.
Figure 6:
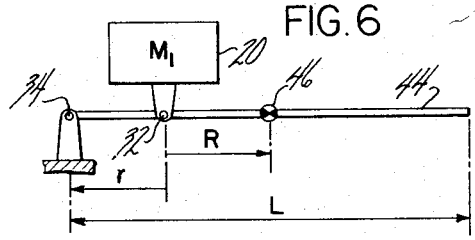

FIG. 6 is a fragmentary schematic illustration of a vibration isolator generally similar to that shown in FIG. 2 but with the inertia means consisting merely of a thin inertia bar.

Figure 7:
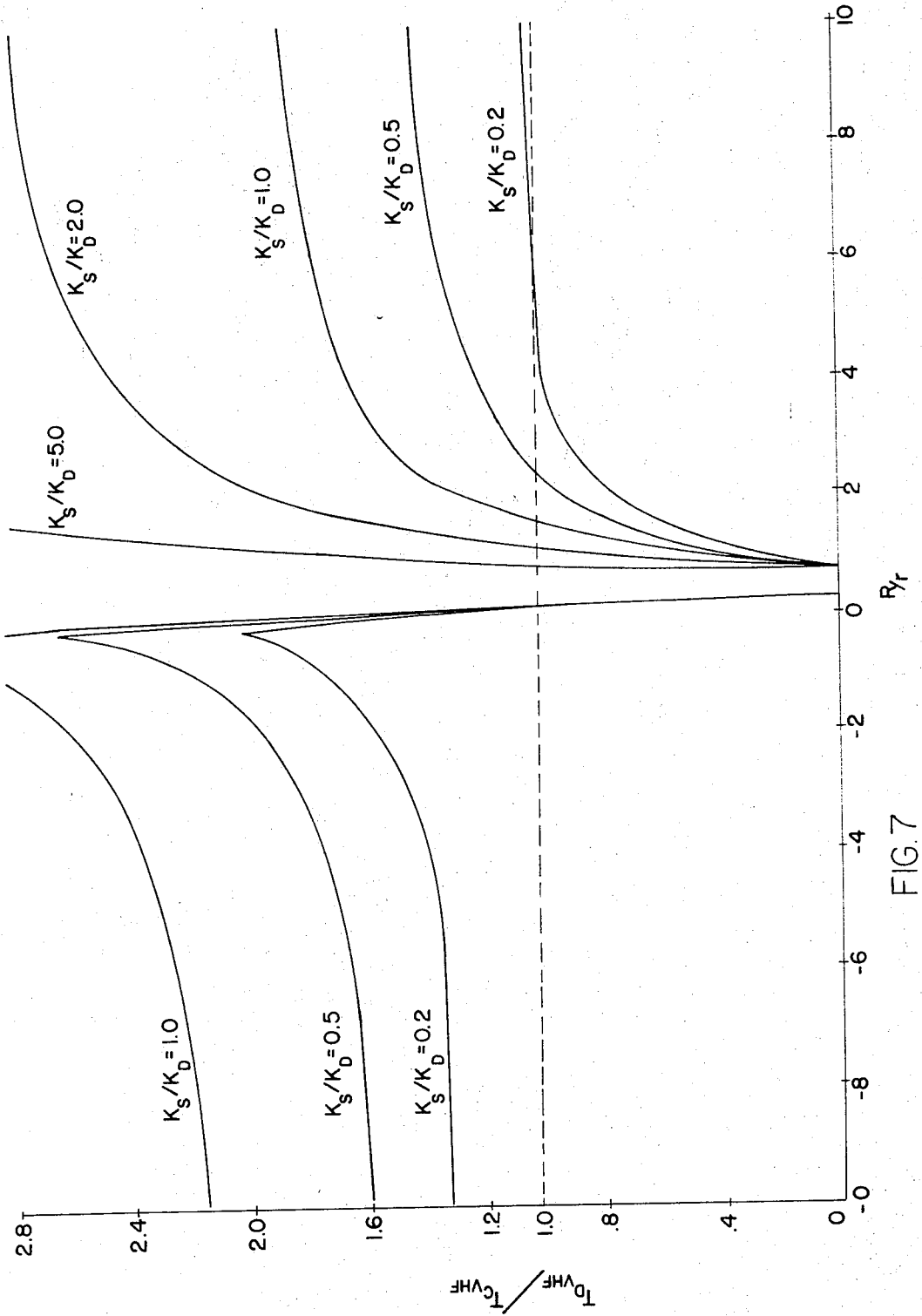

FIG. 7 is a series of curves showing how the devices of FIG. 5 and FIG. 6 compare in operation with a conventional spring and mass isolator at very high frequency.

Description of the preferred embodiments

The vibration isolator of the present invention is intended to serve generally the same purpose as the vibration isolator described in my copending application Ser. No. 408,543, referred to above. That is, it is intended to be interposed between two bodies, having at least one degree of freedom of movement relative to each other, for the purpose of preventing or reducing the transmission of vibratory displacements and forces from one body to the other body. For the purposes of this description and in the claims which follow the body which vibrates is referred to as the "vibratory body" or "base" and the body which is to be statically supported by, or otherwise connected with, the base while nevertheless being isolated from the vibratory movements thereof is referred to as the "isolated body."

In accordance with the invention, and as mentioned above, an intermediate member is located between the base and the isolated body and is connected to the base by a spring and damper arrangement. Between the intermediate member and isolated item is another spring and damper and an inertia system providing an auxiliary mass which is moved relative to both the intermediate member and the isolated item in response to relative movement of the latter two parts to produce an inertia force counteracting the vibratory force. The inertia system and the spring provided between the intermediate member and the isolated body may be arranged generally similarly to the inertia system and spring of the vibration isolator shown in my copending application Ser. No. 408,543. The isolator of the copending application, however, approaches a finite value of isolation or transmissibility at high frequencies of vibration and this can be a disadvantage for some applications. The damper provided between the isolated body and the intermediate member, and the spring and damper provided between the intermediate member and the base, as used in the present invention, produce a system which retains the advantages of the previous isolator while at the same time provides a transmissibility which approaches zero at very high frequency.

In the drawings, FIGS. 1 and 2 show two different basic forms which the isolator of this invention may take. In FIG. 1 the pivot axes connecting the inertia means to the isolated body and to the intermediate member are so arranged with relation to the center of gravity of the inertia means that the system has what is referred to as a positive *R/r* value. In FIG. 2 the arrangement is such that the system has what is referred to as a negative *R/r* value.

Turning to the drawings and first considering FIG. 1, which shows a positive *R/r* isolator, the isolated body is shown at 20 and the base at 22. As indicated at the left of the figure the base 22 undergoes a vibratory displacement which may be considered generally sinusoidal in nature and which is represented as $Z_B$. The isolated body 20 has a mass $M_I$ and its displacement is represented as $Z_I$. An intermediate member 24 is located between the body 20 and the base 22 and has a mass $M_S$ and a displacement $Z_S$. Between the isolated body 20 and the intermediate member 24 is an inertia means which consists of a rod 26 and an auxiliary mass 28. The center of gravity of this inertia means, that is the combined center of gravity of the rod 26 and auxiliary mass 28, is indicated at 30. This inertia means is aranged so as to be moved relative to both the isolated body 20 and the intermediate member 24 in response to relative movement of the isolated body relative to the intermediate member, and for this purpose the rod 26 is pivotally connected to the isolated body for movement about one axis, indicated at 32, and is pivotally connected for movement relative to the intermediate member about a second axis, indicated at 34. The two axes 32 and 34 are parallel to and spaced from one another in a direction normal to the axis along which the base 22 moves relative to the body, which is the vertical axis 35 in FIG. 1. The spacing between the pivot axes 32 and 34 is represented as $r$. The center of gravity 30 of the inertia means is also spaced from the axis 32, and this displacement is represented as $R$. In the mathematical discussion which follows, and as shown at the bottom of FIG. 1, the vertical axis 35 which passes through the axis 32 is taken as a zero or reference axis and the displacements of the axis 34 and of the center of gravity 30 are measured from this reference axis. Furthermore, the direction in which the center of gravity 30 is displaced from the reference axis 32 is taken as the positive direction. In FIG. 1 both the axis 34 and the center of gravity 30 are displaced on the same side of the reference axis 32 and therefore both $r$ and $R$ are posiitve, giving the isolator a positive $R/r$ value.

In addition to the isolated body and the intermediate member of FIG. 1 being interconnected by the inertia means, they are also connected by a set of springs indicated at 36, 36 and a damper 38. The springs 36, 36 statically support the body 20 from the intermediate member when the system is at rest and also cooperate with the inertia element to produce the desired antiresonance. The combined spring constant of the springs between the isolated body and the intermediate member is represented by the value $K_D$ and the coefficient of damping provided by the damper 38 is represented by the value $C_D$.

The intermediate member 24 is connected with the base 22 by a simple spring and damper system which, as shown, consists of a set of springs 40, 40 and a damper 42. The combined spring constant of the springs 40, 40 is represented by the value $K_S$ and the coefficient of damping provided by the damper 42 is represented by the value $C_S$. It should, of course, be understood that in FIG. 1, and in the other figures, the various mechanical elements of the isolator have been shown schematically and that in actual practice they may take a wide variety of different forms, the main requirement being that there be elements present which provide the desired values of inertia, spring constant and damping interrelated with one another in substantially the manner illustrated.

FIG. 2 shows an isolator having a negative value of $R/r$. The parts comprising this isolator are substantially the same as those comprising the isolator of FIG. 1, the principle difference between the two isolators being that in FIG. 2 the pivot axes connecting the inertia means to the isolated body and to the intermediate member are differently arranged than in FIG. 1. The parts of the isolator in FIG. 2 have therefore been given the same reference numerals as the isolator of FIG. 1 and the isolator of FIG. 2 need not be redescribed in detail. It should be noted, however, that in the FIG. 2 isolator the pivot axis 32 (connecting the lever 26 to the body 20) is located between the pivot axis 34 (connecting the lever 26 to the intermediate member 24) and the center of gravity 30 as compared to the isolator of FIG. 1 wherein the pivot axis 34 is located between the pivot axis 32 and the center of gravity 30. Therefore, as shown at the bottom of FIG. 2, if the vertical axis 35 passing through the pivot axis 32 is taken as a reference axis, and if the direction in which the center of gravity 30 is displaced from the axis 32 is taken as the positive direction, then in FIG. 2 the displacement $r$ of the axis 34 from the axis 32 is a negative value, giving the isolator a negative $R/r$ value.

It has been found that as far as operation or results are concerned the positive $R/r$ isolator of FIG. 1 generally is better than the negative $R/r$ isolator of FIG. 2, particularly in connection with high frequency vibrations. As explained hereinafter in connection with FIG. 7, a positive $R/r$ isolator, by properly selecting the value of $R/r$ and other parameters, can be made to have much better isolation at high frequencies than a conventional spring-mass isolator. On the other hand, a negative $R/r$ isolator generally has somewhat poorer isolation at high frequencies than a conventional spring-mass isolator. Nevertheless, at lower frequencies, particularly near the antiresonant frequency, it has very good isolation and may therefore often be preferred over a conventional spring-mass isolator for this reason.

The performance of the isolator of either FIG. 1 or FIG. 2 may perhaps be best understood by the following mathematical analysis. From either FIG. 1 or FIG. 2 the energy equations for the illustrated system can be written as follows:

Kinetic energy:

$$T = \tfrac{1}{2} M_I \dot{Z}_I^2 + \tfrac{1}{2} M_D \dot{Z}_D^2 + \tfrac{1}{2} M_S \dot{Z}_S^2 + \tfrac{1}{2} I \dot{\theta}^2 \quad (1)$$

Potential energy:

$$V = \tfrac{1}{2} K_D (Z_I - Z_S)^2 + \tfrac{1}{2} K_S (Z_S - Z_B)^2 \quad (2)$$

Dissipation energy:

$$D = \tfrac{1}{2} C_D (\dot{Z}_I - \dot{Z}_S)^2 + \tfrac{1}{2} C_S (\dot{Z}_S - \dot{Z}_B)^2 \quad (3)$$

In Equation 1 $\theta$ is the angular displacement of the lever about the axis 34, and it will be observed that $$\theta = \frac{Z_S - Z_I}{r} \quad (4)$$

and $$Z_D = Z_S R/r - Z_I (R/r - 1) \quad (5)$$

Substituting Equations 4 and 5 in Equation 1, it becomes:

$$T = \tfrac{1}{2} M_I \dot{Z}_I^2 + \tfrac{1}{2} M_D [\dot{Z}_S (R/r) - \dot{Z}_I (R/r - 1)]^2 + \tfrac{1}{2} M_S \dot{Z}_S^2 + \tfrac{1}{2} I/r^2 (\dot{Z}_I - \dot{Z}_S)^2 \quad (6)$$

Applying Lagrange's equation, the equations of motion become:

$$[M_I + M_D (R/r - 1)^2 + I/r^2] \ddot{Z}_I + C_D \dot{Z}_I + K_S Z_I$$
$$- [M_D (R/r)(R/r - 1) + I/r^2] \ddot{Z}_S$$
$$- C_D \dot{Z}_S - K_D Z_S = 0 \quad (7)$$

$$- [M_D (R/r)(R/r - 1) + I/r^2] \ddot{Z}_I - C_D \dot{Z}_I - K_S Z_I$$
$$+ [M_S + M_D (R/r)^2 + I/r^2] \ddot{Z}_S + (C_D + C_S) \dot{Z}_S$$
$$+ (K_D + K_S) Z_S = C_S \dot{Z}_B + K_S Z_B \quad (8)$$

Assuming a solution of the form $Z = Z_0 e^{i\omega t}$, and letting:

$$M_A = M_D (R/r)(R/r - 1) + I/r^2$$
$$M_R = M_I + M_D (R/r - 1)^2 + I/r^2$$
$$M_T = M_S + M_D (R/r)^2 + I/r^2$$

the equations may be written in matrix form as follows:

$$\begin{bmatrix} -M_R \omega^2 + K_D + i\omega C_D & M_A \omega^2 - K_D - i\omega C_D \\ -M_A \omega^2 - K_D - i\omega C_D & -M_T \omega^2 + (K_D + K_S) + i\omega(C_D + C_S) \end{bmatrix} \begin{bmatrix} Z_{I_0} \\ Z_{S_0} \end{bmatrix} = \begin{bmatrix} 0 \\ (K_S + i\omega C_S) Z_{B_0} \end{bmatrix} \quad (9)$$

Using Cramer's rule, and solving the above matrix for $Z_{I_0}$, the transmissibility equation is:

$$T_D = \frac{Z_{I_0}}{Z_{B_0}} = \frac{[K_S(K_D - \omega^2 M_A) - \omega^2 C_S C_D] + i\omega[(K_D - M_A\omega^2)C_S + C_D K_S]}{\Delta} \quad (10)$$

where $$\Delta = \{(M_T M_R - M_A^2)\omega^4 - \omega^2[M_R(K_S + K_D) - 2M_A K_D + M_T K_D + C_D C_S] + K_D K_S\} - i\{\omega^3[M_R(C_S + C_D) + M_T C_D - 2M_A C_D] - \omega[C_D K_S + C_S K_D]\} \quad (11)$$

Equation 11 is the characteristic frequency equation of the isolator.

The transmissibility equation of the isolator can be nondimensionalized by letting:

$$\omega_A^2 = K_D/M_A$$

(antiresonant frequency of the system between the isolated body and the intermediate member.)

$$\omega_S^2 = K_S/M_I$$

(Natural frequency of the conventional system.)

$$\zeta_A = C_D/C_A$$

(Percent damping at antiresonance.)

$$\xi_S = C_S/C_C$$

(Percent critical damping of the conventional system.) where $C_A = 2M_A\omega_A$ and $C_C = 2M_I\omega_S$.

$$\mu_D = M_D/M_I$$

(Mass ratio of inertia means to isolated mass.)

$$\mu_S = M_S/M_I$$

(Ratio of intermediate mass to isolated mass.)

Substituting the above into Equation 10, the transmissibility of the isolator can be written in the following form:

$$T_D = \frac{A + iB}{C + iD} \quad (12)$$

and the absolute magnitude of the transmissibility is:

$$|T_D| = \sqrt{\frac{A^2 + B^2}{C^2 + D^2}} \quad (13)$$

where:

$$A = \left\{\frac{\omega_S^2}{\omega_A^2}\left(1 - \frac{\omega^2}{\omega_A^2}\right) - 4\zeta_A\zeta_S\frac{\omega_S}{\omega_A}\frac{\omega^2}{\omega_A^2}\right\} \quad (14)$$

$$B = 2\frac{\omega}{\omega_A}\left\{\zeta\frac{\omega_S}{\omega_A}\left(1 - \frac{\omega^2}{\omega_A^2}\right) + \frac{\omega_S^2}{\omega_A^2}\zeta_A\right\} \quad (15)$$

$$C = \left[\frac{\mu_D[(R/r)^2 + \rho^2/r^2]}{M_A/M_I} + \mu_S\frac{M_R}{M_A} + \frac{\mu_D^2\rho^2/r^2}{M_A/M_I}\right]\frac{\omega^4}{\omega_A^4}$$
$$-\left[\frac{\omega_S^2}{\omega_A^2}\frac{M_R}{M_A} + (1+\mu_D+\mu_S) + \frac{4\omega_S}{\omega_A}\zeta_A\zeta_S\right]\frac{\omega^2}{\omega_A^2} + \frac{\omega_S^2}{\omega_A^2} \quad (16)$$

$$D = 2\frac{\omega}{\omega_A}\left\{\left(\zeta_S\frac{\omega_S}{\omega_A} + \zeta_A\frac{\omega_S^2}{\omega_A^2}\right) - \left[\frac{M_R}{M_A}\frac{\omega_S}{\omega_A}\zeta_S + (1+\mu_S+\mu_D)\zeta_A\right]\frac{\omega^2}{\omega_A^2}\right\} \quad (17)$$

The denominator of the transmissibility equation is the damped natural frequency equation of the isolator. It is seen that if $\zeta_A = 0$ (zero damping across the intermediate member 24 and the isolated body 20), damped natural frequencies still occur, and the amplitude at resonance can be controlled. However, in the numerator with $\zeta_A = 0$, one hundred percent isolation can be obtained. Also, as $\omega/\omega_A$ approaches infinity, the transmissibility approaches zero. Thus, an isolator embodying this invention can be designed to give approximately one hundred percent isolation at a discrete frequency, have controlled resonant amplitudes, and give high frequency isolation.

Since the isolator of this invention can be designed to give desirable high frequency isolation, an interesting comparison may be made between the high frequency isolation of the present isolator and a conventional spring-mass system. This comparison is made on the undamped transmissibility equations. The undamped transmissibility equation of the present isolator is:

$$T_D = \frac{\omega_S^2/\omega_A^2(1 - \omega^2/\omega_A^2)}{\left[\frac{\mu_D[(R/r)^2 + \rho^2/r^2]}{M_A/M_I} + \mu_S\frac{M_R}{M_A} + \frac{\mu_D^2\rho^2/r^2}{M_A/M_I}\right]\frac{\omega^4}{\omega_A^4} - \left[\frac{\omega_S^2}{\omega_A^2}\frac{M_R}{M_A}(1+\mu_D+\mu_S)\right]\frac{\omega^2}{\omega_A} + \frac{\omega_S^2}{\omega_A^2}} \quad (18)$$

where $\rho$ = the radius of gyration of the inertia means about the center of gravity. However, $$M_A/M_I = \mu_D[(R/r)(R/r - 1) + \rho^2/r^2]$$

and $$M_R/M_I = 1 + \mu_D[(R/r)(R/r - 1) + \rho^2/r^2]$$

Therefore, the rtansmissibility equation can be rewritten as:

$$T_D = \frac{\mu_D[(R/r)(R/r - 1) + \rho^2/r^2]\left(\frac{\omega_S^2}{\omega_A^2}\right)\left(1 - \frac{\mu^2}{\mu_A^2}\right)}{\begin{bmatrix}\{\mu_D[(R/r)^2 + \rho^2/r^2 + \mu_S[1 + \mu_D[(R/r - 1)^2 + \rho^2/r^2]] + \mu_D^2\rho^2/r^2\}\frac{\omega^4}{\omega_A^4} \\ -\{\frac{\omega_S^2}{\omega_A^2}[1 + \mu_D[(R/r - 1)^2 + \rho^2/r^2]] + \mu_D[(R/r - 1)R/r + \rho^2/r^2](1+\mu_D+\mu_S)\}\frac{\omega^2}{\omega_A^2} \\ + \mu_D[(R/r - 1)(R/r) + \rho^2/r^2]\frac{\omega_S^2}{\omega_A^2}\end{bmatrix}} \quad (19)$$

The undamped transmissibility equation of a conventional spring-mass system is:

$$T_c = \frac{1}{\left(1 - \frac{\omega^2}{\omega_n^2}\right)} \quad (20)$$

For an equivalent conventional spring-mass system having the same overall spring rate as the present isolator then, $$\omega_n^2 = \frac{K_S K_D}{(K_S + K_D)M_I} = \frac{K_D}{K_S K_D}\omega_S^2 \quad (21)$$

Using the above relationship, Equation 20 can be rewritten as:

$$T_c = \frac{\omega_S^2/\omega_A^2}{\left[\frac{\omega_S^2}{\omega_A^2} - \left(1+\frac{K_S}{K_D}\right)\frac{\omega^2}{\omega_A^2}\right]} \quad (22)$$

A ratio of the transmissibilities are then obtained by dividing the present isolator transmissibility Equation 19 by the equivalent conventional transmissibility Equation 22, resulting in the following equation:

$$\frac{T_D}{T_C} =$$

$$\frac{\mu_D[(R/r)(R/r-1)+\rho^2/r^2]\left\{\left(1-\frac{\omega^2}{\omega_A^2}\right)\left[\frac{\omega_S^2}{\omega_A^2}-\left(1+\frac{K_S}{K_D}\right)\frac{\omega^2}{\omega_A^2}\right]\right\}}{E\frac{\omega^d}{\omega_A{}^d}-F\frac{\omega^2}{\omega_A{}^2}+G} \quad (23)$$

where:

$$E = \mu_D[(R/r)^2 + \rho^2/r^2]$$
$$+ \mu_S\{1+\mu_D[(R/r-1)^2+\rho^2/r^2]\} + \mu_D{}^2\rho^2/r^2$$

$$F = \frac{\omega_S^2}{\omega_H^2}\{1+\mu_D[(R/r-1)^2+\rho^2/r^2]\} + \mu_D[(R/r)(R/r-1)$$
$$+ \rho^2/r^2](1+\mu_D+\mu_S)$$

$$G = \mu_D[(R/r)(R/r-1)+\rho^2/r^2]\frac{\omega_S^2}{\omega_A^2}$$

To compare at very high frequency, divide the numerator and denominator by $\omega^4/\omega_A{}^4$ and let $\omega/\omega_A$ approach infinity. The ratio then becomes:

$$\frac{T_{D_{VHF}}}{T_{C_{VHF}}} =$$

$$\frac{(1+K_S/K_o)[(R/r)(R/r-1)+\rho^2/r^2}{[(R/r)^2+\rho^2/r^2]+\mu_S[(R/r-1)^2+\rho^2/r^2]+\mu_S/\mu_D+\mu_D\rho^2/r^2} \quad (24)$$

In order to use this equation for a comparison of the present isolator with that of a conventional spring-mass isolator a simplification may be made by considering the inertia means of the present isolator to consist merely of a thin rod as shown in either FIG. 5 or FIG. 6. That is, in FIG. 5 the isolator is the same as that shown in FIG. 1 except that the inertia means of FIG. 1, consisting of the rod 26 and auxiliary mass 28, is replaced by a single rod 44 having a center of gravity 46 located approximately at its midpoint. Similarly, in FIG. 6 the illustrated isolator is the same as that shown in FIG. 2 except for the rod 26 and auxiliary mass 28 being replaced by facing a rod 44 having its center of gravity 46 at approximately its midpoint. In FIG. 5 it is seen that for a positive value of $R/r$ equal to or greater than 0.5, $L=2R$, and since for a straight rod $\rho^2=L/12$ then for an isolator with a positive $R/r$ equal to or greater than 0.5.

$$\rho^2/r^2 = R^2/3r^2$$

From FIG. 6, it is seen that for values of $R/r$ less than 0.5, $L=2(R-r)$, and therefore, $$\rho^2/r^2 = \frac{(1-R/r)^2}{3}$$

in which the actual value and not the absolute amplitude of $R/r$ should be used. Therefore, two equations are obtained from Equation 24.

For positive values of $R/r$ equal to or greater than 0.5 then:

$$\frac{T_{D_{VHF}}}{T_{C_{VHF}}} =$$

$$\frac{(1+K_S/K_D)[4/3R/r-1]R/r}{4/3(R/r)^2+\mu_s[(R/r-1)^2+1/3(R/r)]^2+\frac{\mu_S}{\mu_D}+\frac{\mu_D}{3}(R/r)^2} \quad (25)$$

and for values of $R/r$ less than 0.5 then:

$$\frac{T_{D_{VHF}}}{T_{C_{VHF}}} = \frac{(1+K_s/K_D)[4/3R/r-1][R/r-1]}{\left[(R/r)^2+\frac{(1-R/r)^2}{3}\right]+\mu_s[(R/r-1)^2}$$
$$+1/3(1-R/r)^2]+\frac{\mu_S}{\mu_D}+\frac{\mu_D}{3}(1-R/r)^2 \quad (26)$$

It is seen from the above equations that a conservative approximation can be obtained by letting $\mu_S=0$ and since $$\frac{\mu_D}{3}(R/r)_2 \ll 4/3(R/r)^2$$

and $$\frac{\mu_D}{3}(1-R/r)^2 \ll \left[(R/r)^2+\frac{(1-R/r)^2}{3}\right]$$

the equations can be rewritten as:

$$\frac{T_{D_{VHF}}}{T_{C_{VHF}}} = (1+K_S/K_D)\left(1-\frac{1}{4/3R/r}\right) \quad (27)$$

for positive $R/r$ equal to or greater than 0.5 and $$\frac{T_{D_{VHF}}}{T_{C_{VHF}}} = \frac{(1+K_S/K_D)(4/3R/r-1/3)(R/r-1)}{(4/3R/r-1/3)R/r-1/3(R/r-1)} \quad (28)$$

for values of $R/r$ less than 0.5.

It is seen from the above equations, that at very high frequencies the comparison of the present isolator to an equivalent spring-mass system is primarily a function of the $R/r$ and $K_S/K_D$ ratios. Calculations may be made varying $R/r$ from $+10$ to $-10$ and varying the spring rate ratio $(K_S/K_D)$ from .2 to 5. The results of such calculations are shown in FIG. 7.

It is seen from FIG. 7 that an isolator of this invention may be designed to give much better high frequency isolation than a conventional spring-mass system of equivalent stiffness. However, a positive $R/r$ value is generally required and this positive value should be as small as possible. Also, the spring ratio $K_S/K_D$ should be as small as possible. That is, the spring rate across the isolated body 20 and the intermediate member 24 should be much stiffer than the spring rate across the intermediate member 24 and the base 22. A negative $R/r$ will, in almost all instances, give high frequency isolation that is less than that of a conventional spring-mass system.

Figure 3:
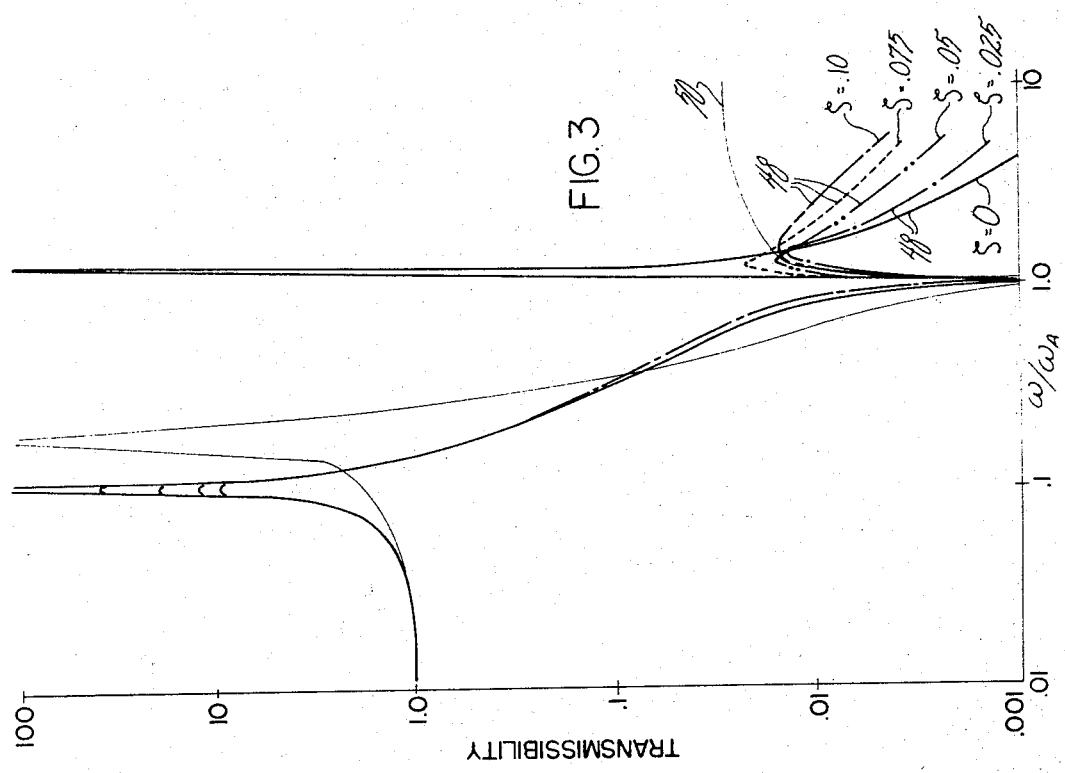
FIG. 3 is a series of curves showing the effect of various values of damping on the operation of a vibration isolator such as shown either in FIG. 1 or FIG. 2 and where the parameters of the isolator are so selected that the two resonant frequencies are located on opposite sides of the antiresonant frequency.

Depending on the values chosen for the various parameters in the design of an isolator embodying this invention one or the other of two general types of response curves may be obtained. FIG. 3 shows one form of response curve (that is a plot of transmissibility versus frequency) and in this curve the antiresonant frequency is located between two resonant peaks. FIG. 4 shows the other general form of response curve and in this curve two resonant peaks are both located below the antiresonant frequency. Generally it has been found that the type of response curve obtained is dependent primarily on the value of $R/r$. For example, in most of the isolators investigated up to this time it has been found that the characteristic curve is of the type shown in FIG. 3 when $R/r$ is of some value less than approximately 0.5, and that the characteristic curve is generally of the type shown in FIG. 4 when the value of $R/r$ is greater than approximately 0.5. FIGS. 3 and 4 show the effects of various different amounts of damping between the intermediate member 24 and the base 22 on the performances of the isolator. FIGS. 3 and 4 also show a comparison of the isolator of this invention with an equivalent isolator of the type shown in my copending application Ser. No. 408,543.

Referring first to FIG. 3, the curves indicated at 48, 48 represent the characteristic curves for an isolator of the present invention operating at different values of damping $f_S$ across the intermediate member 24 and the base 22. The curve 50 represents the characteristic curve of an equivalent isolator of the type shown in my copending application. The isolator represented by the curves 48, 48 is one having zero damping between the isolated body 20 and the intermediate member 24. From FIG. 3 it can be seen, therefore, that at high frequencies of operation, that is at frequencies substantially above the antiresonant frequency $\omega_A$, the isolator of the present invention has a significantly better isolation capability than the isolator of the previous application. Also, it will be noted that the high frequency performance of the present isolator is generally improved as the damping between the intermediate member and the base is reduced. Below the antiresonant frequency the normal amount of damping $\zeta_S$ which would be used has little effect on the operation of the isolator except in the vicinity of the resonances, the amplitudes of the resonant peaks being desirably reduced by the damping.

Referring to FIG. 4, the curves 52, 52 of this figure are the characteristic curves of an isolator of the present invention constructed so that the two resonant peaks of the characteristic curves are located below the antiresonant frequency. The curves 52, 52 show the operation of the isolator under different values of damping $\zeta_S$ between the intermediate member 24 and the base 22, the isolator having no damping between the isolated body 20 and the intermediate member 24. The curve 54 represents the performance of an equivalent isolator made in accordance with my copending application Ser. No. 408,543. From FIG. 4 it will be noted again that at very high frequencies, or frequencies substantially above the antiresonant frequency $\omega_A$ the isolator of this invention produces a substantially improved isolation in comparison with that of the previous isolator. Also, it will be noted that as the damping between the intermediate member 24 and the base 22 is decreased, the isolation capability is also increased. Below the antiresonant frequency the normal amount of damping $\zeta_S$ which would be used has little effect on the performance of the isolator except in the vicinity of the resonances, the amplitudes of the resonant peaks being desirably reduced by the damping.

In connection with both FIGS. 3 and 4, if larger amounts of damping $\zeta_S$ are used, the resonant peaks may be further reduced, but other areas of the curve may be adversly affected by producing less isolation at some frequencies. Nevertheless it should be particularly noted that for all values of damping $\zeta_S$ a zero transmissibility is produced at one frequency (when there is no damping $\zeta_D$ across the isolated body 20 and the intermediate member 24) and therefore the isolator of this invention has the ability to reduce resonant peaks while still producing one hundred percent isolation at one frequency.

I claim:

1. The combination with a body and base of a vibration isolator for connecting said body to said base and for reducing the transmission of vibratory forces and displacements from said base to said body occurring generally parallel to a given reference axis, said isolator including an intermediate member, an inertia means, means connecting said inertia means to said body and to said intermediate member for movement relative to both said body and said intermediate member in response to relative movement between said body and said intermediate member occurring along said reference axis, first spring means between said body and said intermediate member providing a resilient resistance to movement of said body relative to said intermediate member along said reference axis, second spring means between said intermediate member and said base providing a resilient resistance to movement of said intermediate member relative to said base along said reference axis, and a damper means between said intermediate member and said base for producing a force opposing relative movement between said intermediate member and said base occurring along said reference axis in response to such movement.

2. The combination defined in claim 1 further characterized by a second damper means located between said body and said intermediate member for producing a force opposing relative movement between said body and said intermediate member occurring along said reference axis in response to such movement.

3. The combination defined in claim 1 further characterized by said inertia means including a lever connected with said body for pivotal movement about a first pivot axis located in a plane generally perpendicular to said reference axis and also connected with said intermediate member for pivotal movement relative thereto about a second axis generally parallel to said first axis, said inertia means having a center of gravity fixed relative to said lever and spaced from said first axis, said center of gravity being located on the same side of said first axis as said second axis.

4. The combination defined in claim 3 further characterized by said inertia system including an auxiliary mass fixed to said lever.

5. The combination as defined in claim 1 further characterized by said inertia means including a lever connecting with said body for pivotal movement about a first pivot axis located in a plane generally perpendicular to said reference axis and also connected with said intermediate member for pivotal movement relative thereto about a second axis generally parallel to said axis, said inertia means having a center of gravity fixed relative to said lever and spaced from said first axis, said center of gravity being located on the opposite side of said first axis from said second axis.

6. The combination defined in claim 5 further characterized by said inertia means including an auxiliary mass fixed to said lever.

References Cited

UNITED STATES PATENTS

| | | | |
|---|---|---|---|
| 1,973,510 | 9/1934 | Schieferstein | 248—358 |
| 3,189,303 | 6/1965 | Boothe | 248—22 |
| 3,202,388 | 8/1965 | Goodwin | 248—8 |
| 3,268,419 | 11/1966 | Wallerstein | 248—20 |

ROY D. FRAZIER, *Primary Examiner.*

J. F. FOSS, *Assistant Examiner.*

U.S. Cl. X.R.

248—358; 267—1

UNITED STATES PATENT OFFICE
CERTIFICATE OF CORRECTION

Patent No. 3,441,238                        April 29, 1969

William G. Flannelly

It is certified that error appears in the above identified patent and that said Letters Patent are hereby corrected as shown below:

Column 4, line 55, "$[M_I + M_D(R/r-1)^2 + I/r^2]\dot{Z}_I +$" should read -- $[M_I + M_D(R/r - 1)^2 + I/r^2]\ddot{Z}_I +$ --; line 63, "$Z = Z_0{}^{i\omega t}$" should read -- $Z = Z_0 e^{i\omega t}$ --; lines 71 and 72, the equation should appear as shown below:

$$\begin{bmatrix} -M_R\omega^2 + K_D + i\omega C_D & M_A\omega^2 - K_D - i\omega C_D \\ -M_A\omega^2 - K_D - i\omega C_D & -M_T\omega^2 + (K_D + K_S) + i\omega(C_D + C_S) \end{bmatrix}$$

Column 5, line 28, "$\xi_S = C_S/C_C$" should read -- $\zeta_S = C_S/C_C$ --.

Column 6, line 50, "rtansmissibility" should read -- transmissibility --; lines 54 to 60, the upper right-hand portion of the equation should appear as shown below:

$$\left(1 - \frac{\omega^2}{\omega_A{}^2}\right)$$

same column 6, lines 74 and 75, the right-hand portion of the equation should appear as shown below:

$$\frac{K_D}{K_S + K_D} \omega_S{}^2$$

Column 7, lines 14 to 16, the lower left-hand portion of the equation should appear as shown below:

$$E \frac{\omega^4}{\omega_A{}^4}$$

3,441,238

(2)

Column 10, line 40, "said axis" should read -- said first axis --.

Signed and sealed this 7th day of July 1970.

(SEAL)
Attest:

EDWARD M. FLETCHER, JR.
Attesting Officer

WILLIAM E. SCHUYLER, JR.
Commissioner of Patents